United States Patent [19]

Crivello et al.

[11] Patent Number: 4,617,238

[45] Date of Patent: Oct. 14, 1986

[54] VINYLOXY-FUNCTIONAL ORGANOPOLYSILOXANE COMPOSITIONS

[75] Inventors: James V. Crivello, Saratoga; Richard P. Eckberg, Roundlake, both of N.Y.

[73] Assignee: General Electric Company, Waterford, N.Y.

[21] Appl. No.: 763,758

[22] Filed: Aug. 7, 1985

Related U.S. Application Data

[63] Continuation of Ser. No. 364,303, Apr. 1, 1982, abandoned.

[51] Int. Cl.$^4$ ................................................ B32B 9/06
[52] U.S. Cl. ..................................... 428/452; 528/12; 528/13; 528/14; 528/15; 528/25; 528/19; 528/31; 528/32; 528/23; 528/33; 525/479; 556/445; 428/447; 522/99
[58] Field of Search ...................... 528/25, 31, 32, 33, 528/19, 23, 12, 13, 14, 15; 525/479; 204/159.13; 556/445; 428/447, 452; 522/99

[56] References Cited

U.S. PATENT DOCUMENTS

| | | | |
|---|---|---|---|
| 2,872,435 | 2/1959 | Speier, Jr. | 260/45.6 |
| 3,814,730 | 6/1974 | Karstedt | 260/46.5 UA |
| 4,069,368 | 1/1978 | Deyak et al. | 428/447 |
| 4,136,250 | 1/1979 | Mueller et al. | 528/29 |
| 4,208,319 | 6/1980 | August et al. | 556/445 |
| 4,279,717 | 6/1981 | Eckberg et al. | 204/159.13 |
| 4,339,563 | 7/1982 | Takago et al. | 538/33 |
| 4,340,647 | 7/1982 | Eckberg | 428/429 |

*Primary Examiner*—Melvyn I. Marquis

[57] ABSTRACT

Photo-curable vinyloxy-functional organosiloxane polymers are provided. Also provided are release coating compositions made by combining said polymers with various photo-initiators. The polymers have a unique vinyloxy functionality; and the release coating compositions cure with brief exposure to ultraviolet radiation to form premium abhesive coatings. Process for preparing the vinyloxy-functional polysiloxanes and the release coating are also disclosed.

40 Claims, No Drawings

VINYLOXY-FUNCTIONAL ORGANOPOLYSILOXANE COMPOSITIONS

This application is a continuation, of application Ser. No. 364,303, filed 04/01/82, now abandoned.

This invention relates to organosiloxane polymers and curable compositions made therefrom. More particularly, it relates to organopolysiloxane compositions having vinyloxy functional groups, and to photocurable release coatings made therefrom which render a normally adherent surface relatively abhesive.

BACKGROUND OF THE INVENTION

Silicone compositions have long been used as release coatings, which are useful in many applications whenever it is necessary to provide a surface or material which is relatively nonadherent to other materials which would normally adhere thereto. For example, silicone release compositions are widely used as coatings which release pressure-sensitive adhesives for labels, decorative laminates, transfer tapes, etc. Silicone release coatings on paper, polyethylene, Mylar®, and other such substrates are also useful to provide non-stick surfaces for food handling and industrial packaging applications.

Previously developed silicone paper release compositions, such as those described in copending U.S. application Ser. No. 267,091, filed May 22, 1981, now U.S. Pat. No. 4,340,647, and U.S. application Ser. No. 359,480, filed Mar. 18, 1982, now abandoned, have been heat curable, but silicone resins which could be cured with exposure to ultraviolet light are desirable.

Ultraviolet light is one of the most widely used types of radiation because of its relatively low cost, ease of maintenance, and low potential hazard to industrial users. Typical curing times are much shorter, and heat-sensative materials can be safely coated and cured under UV light where thermal energy might damage the substrate.

UV-curable epoxy-functional silicones have been disclosed in U.S. Pat. No. 4,069,368 (Deyak) and U.S. application Ser. No. 063,168, filed Aug. 3, 1979, now abandoned. Because of their high reactivity, vinyloxy-functional silicones are highly attractive, but until now only the preparation of vinyl ether trialkoxysilanes, in Ger. Offen. No. 2,159,723 (9/14/73; Bier et al.), has been described; the successful synthesis of vinyloxy-functional silicone polymer resins has not been reported.

It has now been discovered that photo-curable vinyloxy-functional polysiloxane resins can be efficiently produced which are catalyzed by a wider variety of curing catalysts than the aforementioned epoxy-functional silicones and, when applied as release coatings to a substrate, cure to a tack-free, no-smear, abhesive surface in as little as 0.15 seconds. The extremely rapid potential cure rate of these materials, and their compatibility with onium salts heretofore believed ineffective for ultraviolet-triggered polymerizations, makes the vinyloxy-functional polyxiloxanes of the present invention extremely attractive to the silicone release coating and other industries.

SUMMARY OF THE INVENTION

Accordingly, it is an object of the present invention to provide vinyloxy-functional siloxane polymers.

It is a further object of this invention to provide novel UV-curable polysiloxane resins suitable for paper release applications.

It is a further object of this invention to provide UV-curable silicone compositions which may be catalyzed by a variety of onium salt curing catalysts.

It is a further object of this invention to provide UV-curable vinyloxy polysiloxane compositions having especially rapid cure rates.

These and other objects are accomplished herein by an organopolysiloxane having at least one Si-bonded vinyloxy functional group of the formula:

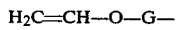

where G is alkylene or alkylene interrupted by at least one of a divalent hetero-radical, such as —O—, divalent phenylene or substituted divalent phenylene, or combinations of such hetero-radicals.

The features contemplated herein are polymers comprised of at least two organosiloxane units each having at least one Si-bonded vinyloxy functional group of the formula

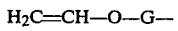

where G is alkylene or alkylene interrupted by at least one of a divalent hetero-radical, such as —O—, divalent phenylene or substituted divalent phenylene, or a combination of such hetero-radicals.

Also contemplated by this invention are photopolymerizable compositions comprising (A) an organopolysiloxane having at least one Si-bonded vinyloxy functional group of the formula:

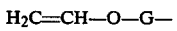

where G is alkylene or alkylene interrupted by at least one of a divalent hetero-radical, such as —O—, divalent phenylene or substituted divalent phenylene, or combinations of such hetero-radicals; and (B) a catalytic amount of an onium salt having the formula:

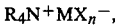

where radicals represented by R can be the same or different organic radicals from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitro, chloro, bromo, cyano, carboxy, mercapto, etc. and also including aromatic heterocyclic radicals including, e.g. pyridyl, thiophenyl, pyranyl, etc.; and $MX_n^-$ is a non-basic, non-nucleophilic anion, typically, $BF_4^-$, $PF_6^-$, $SbF_6^-$, $SbCl_6^-$, $HSO_4^-$, $ClO_4^-$, etc.

In the above and following descriptions, the phrase "hetero-radical" is used with reference to alkylene, to mean radicals that are different from alkylene. They may be organic or inorganic, and the variety of suitable radicals encompassed by the phrase should in no way be limited by any partial listing, for illustration, of hetero-radicals occuring in descriptions of the invention or the claims. Especially contemplated hetero-radicals include —O—, divalent phenylene and substituted divalent phenylene.

Also contemplated herein are a process for producing vinyloxy-functional polysiloxane resins and a process for producing release compositions based on such resins.

DETAILED DESCRIPTION OF THE INVENTION

The vinyloxy-functional polysiloxanes of the present invention are prepared by hydrosilation of compounds containing both allyl and vinyl ether functional groups. The resulting vinyloxy-functional silicone resins can then be cured by dissolving a suitable photoinitiator in the resin and exposing it to ultraviolet radiation. The resin will harden to a tack-free, smear-free condition, usually in from one second to ten minutes, in many cases even less than one second.

The hydrosilation of vinyl ethers catalyzed by platinum compounds is well known. See, for example, Belezina and Alekseeva, Izv. Sibirsk. Otd. Akad. Nauk., SSSR Ser. Khim. Nauk. (3), 92(1963), Chem Abstr. 54, 11984 (1960) and Sokolov, Grishko, Kaznetsova and Sultangareev, Zh. Obshch. Khim., 37, 260(1967), Chem. Abstr. 66, 8915 (1967), which document the following hydrosilations:

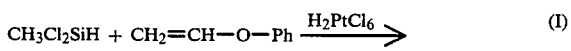
(I)

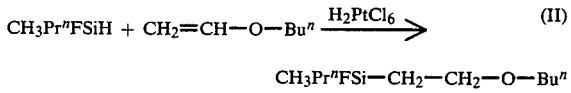

and

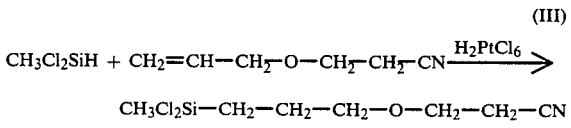
(II)

Similarly, hydrosilation of allyl ethers is also well known. U.S. Pat. No. 2,872,435 (Speier), Chem. Abstr. 53, 13106 (1959), for example, describes the following:

$$CH_3Cl_2SiH + CH_2=CH-CH_2-O-CH_2-CH_2-CN \xrightarrow{H_2PtCl_6}$$

$$CH_3Cl_2Si-CH_2-CH_2-CH_2-O-CH_2-CH_2-CN$$
(III)

Allyl vinyl ether ($CH_2$=CH—CH$_2$—O—CH=CH$_2$), and compounds containing both vinyl ether and allyl ether functional groups, are expected to undergo silation at both unsaturated sites, and platinum-catalyzed reaction of allyl vinyl ethers with silicone resins containing terminal and pendent Si—H groups are expected to undergo cross-linking, based on (I)-(III), supra. It has been recently discovered, however, that the rate of ≡Si—H addition to allyl vinyl ethers is very much faster at the allyl site than at the vinyl site. This means that a vinyloxy-functional compound can be obtained preferentially from a reaction of allyl vinyl ethers and Si—H-containing compounds, as follows:

$$\equiv Si-H + CH_2=CH-CH_2-O-CH=CH_2 \xrightarrow{H_2PtCl_6}$$
(IV)

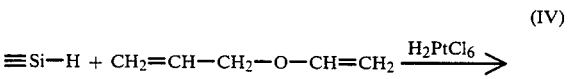

The discovery has made it possible to develop vinyloxy-functional polysiloxane resins, according to the following generalized scheme:

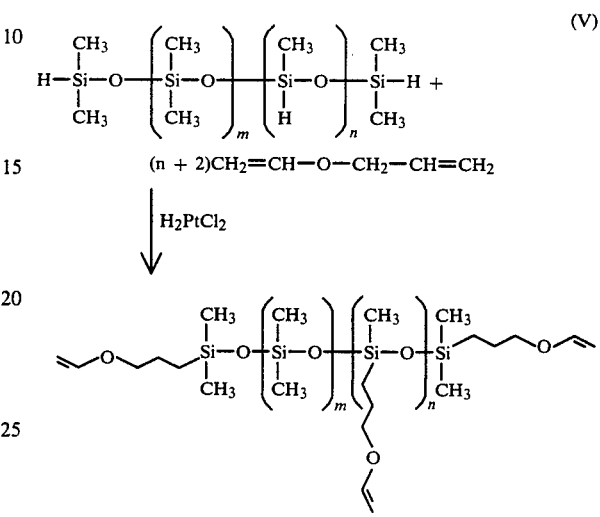
(V)

The vinyloxy-functional monomers composing the resins produced in like reactions are highly reactive in photoinitiated cationic polymerizations, and the polymer resins are consequently very active and give cross-linked resins.

Silicon-containing starting materials which are suitable for the purposes herein include any polysiloxane compound derived from at least two organosiloxane units and having terminal and/or pendent Si—H groups. The Si—H groups act as reaction sites in hydrosilation addition reactions like those described in equations (I)-(V), supra.

Preferred polysiloxane compounds for the purposes herein are polydimethyl-methylhydrogen siloxane copolymer fluids. It has been discovered that release compositions made according to this invention using these starting materials form premium release coatings curable by brief exposure (e.g., <2 sec.) to UV radiation in the presence of onium salt catalysts. Furthermore, the vinyloxy-functional resins so prepared have been found to cure not only in the presence of bis(dodecylphenyl)iodonium hexafluoroantimonate, described for use with epoxy-functional silicones in U.S. Pat. No. 4,279,717 (Eckberg et al.), but also in the presence of bis(dodecylphenyl)iodonium bisulfate, $(C_{12}H_{25}Ph)_2IHSO_4$. The bisulfate salt is inactive in epoxy-functional silicone compositions but will successfully catalyze curing of vinyloxy compounds prepared as disclosed herein.

The suitability of the bisulfate salt catalyst for curing the silicone polymers of the present invention is an extremely important development because the bisulfate is much easier and cheaper to derive than the corresponding hexafluoroantimonates ($SbF_6^-$) and hexafluoroarsenates ($AsF_6^-$). Details of the preparation of $(C_{12}H_{25}Ph)_2IHSO_4$ are contained in U.S. Pat. No. 4,279,717 which is hereby incorporated by reference.

The silicon-containing starting materials are reacted with compounds containing both allyloxy and vinyloxy functional groups. Allyl vinyl ether is an easily obtainable source, and is preferred. It has also been discovered that such compounds may be synthesized by adding vinyloxy functionality to an allyl-functional compound in reactions such as (VI) and (VII), below. For such syntheses, allylphenols are preferred; eugenol, which is a readily-obtainable natural product, is most preferred.

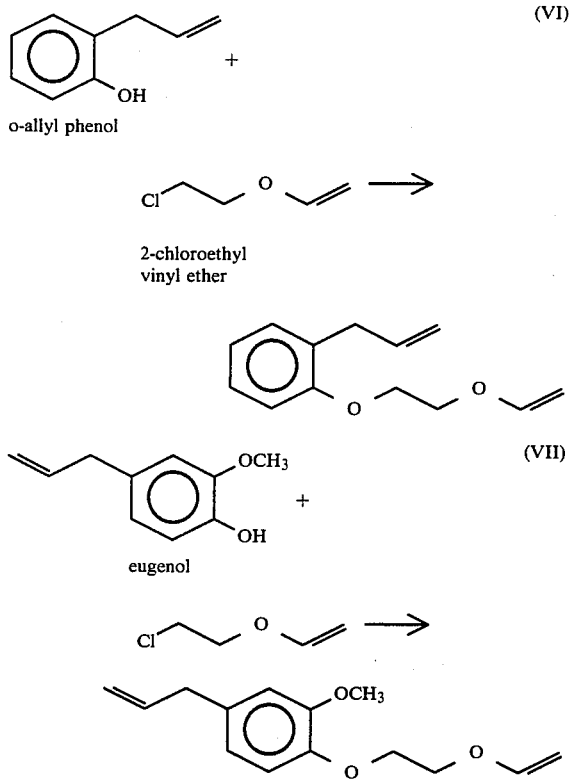

Once an allyl- or allyloxy- and vinyloxy-functional compound is obtained, it may be reacted via hydrosilation addition, with the silicon-containing starting material described above, to yield a vinyloxy-functional polysiloxane which is one feature of the present invention. From this reaction product can be formed a photo-curable release composition by combining the reaction product with a catalytic amount of an onium salt photoinitiator.

Suitable photoinitiators for vinyloxy-functional silicone resins are the onium salts having the formulae:

$R_2I^+MX_n^-$ $R_3S^+MX_n^-$ $R_3Se^+MX_n^-$ $R_4P^+MX_n^-$ $R_4N^+MX_n^-$ where radicals represented by R can be the same or different organic radicals from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitro, chloro, bromo, cyano, carboxy, mercapto, etc. and also including aromatic heterocyclic radicals including, e.g. pyridyl, thiophenyl, pyranyl, etc.; and $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like.

Cure can be achieved by dissolving one of the above photoinitiators in the vinyloxy-functional silicone resin and exposing it to ultraviolet radiation. In most cases, the resin will harden and become tack-free in from one second to 10 minutes.

While it is advantageous to employ UV light to cure these resins, one is by no means restricted only to wavelengths from 190–400 nm. The range of sensitivity of these resin-photoinitiators can be extended into the visibility region of the spectrum through the use of dye sensitizers, as discussed in Crivello and Lam, *Journal of Polymer Science*, 17(4), 1059 (1979); Crivello and Lam, *Journal of Polymer Science*, 16, 2441 (1978), which are incorporated herein by reference.

The amount of catalyst employed is not critical, so long as proper polymerization is effected. As with any catalyst, it is preferable to use the smallest effective amount possible; and for the purposes herein, catalyst levels of from about 1%–5% by weight have been found suitable.

The photo-curable vinyloxy-functional silicone compositions of the present invention can be applied to cellulosic and other substrates including paper, metal, foil, glass, polyethylene coated kraft paper (PEK), supercalendered kraft paper (SCK), polyethylene films, polypropylene films and polyester films. A photoinitiated reaction will cure the vinyloxy-functional silicone compositions of the present invention to form an abhesive surface on the coated substrate.

In order that persons skilled in the art may better understand the practice of the present invention, the following examples are provided by way of illustration, and not by way of limitation.

EXAMPLE 1

Condensation of Tetramethyldisiloxane with Allyl Vinyl Ether

Approximately 0.1 parts by weight 5% catalyst prepared from chloroplatinic acid and sym-tetramethyldivinyldisiloxane ("Karstedt Catalyst", U.S. Pat. No. 3,814,730) were added to 6.7 parts by weight 1,1,3,3-tetramethyldisiloxane. The solution was slowly added, with thorough mixing, to 8.4 parts by weight allyl vinyl ether. After addition was complete, the reaction mixture was heated to 60° C. for 1 hour, then 80°–85°.C. for an additional 5 hours. NMR analysis of the product indicated condensation was complete and had taken place at the allyl site.

A photo-curable composition was prepared by dissolving approximately 3 parts by weight 4,4'-di-t-butyldiphenyl iodonium hexafluoroarsenate in 3 parts by weight acetone and mixing it with 97 parts by weight of the above reaction product, a vinyloxy-terminated silicone resin. This was coated on a glass plate to a thickness of 1 mil and exposed to a General Electric H3T7 medium pressure mercury arc lamp at a distance of approximately six inches. The silicone resin film cured in 7 seconds.

EXAMPLE 2

Condensation of a ≡Si—H Functional Resin with Allyl Vinyl Ether

Approximately 0.1 parts by weight Karstedt Catalyst was added to 10 parts by weight allyl vinyl ether. This solution was added dropwise to 50 parts by weight of a 90 cps silicone fluid having about 12% pendent and terminal Si—H groups. When the addition was complete, the reaction mixture was heated at 80° C. for 1 hour, followed by 65°-70° C. for 8 hours. Unreacted allyl vinyl ether was removed on a rotary evaporator.

A photo-curable composition was prepared by dissolving 3 parts by weight

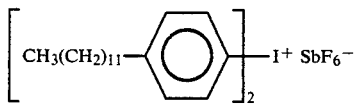

in 3 parts by weight acetone and adding this to 97 parts by weight of the above vinyloxy-functional silicone resin condensation product. When coated on supercalendered kraft paper and cured as in Example 1 a tack-free release film was obtained in 15 seconds.

EXAMPLE 3 o-allyl-2-vinyloxyethoxy benzene (AVB) was synthesized by reacting o-allylphenyl with 2-chloroethyl vinyl ether. 26 parts by weight of AVB were dissolved in 400 parts by weight toluene containing 0.05 parts by weight platinum catalyst. 150 parts by weight of 100 cps dimethyl-methylhydrogen polysiloxane copolymer fluid containing about 2.5%

units were slowly added to the stirring toluene solution. This reaction mixture was refluxed at 114° C. for eighteen hours, after which less than 0.3% unreacted Si—H groups was detected by infrared absorption. The toluene was removed at 110° C. under vacuum to yield a clear fluid product having a viscosity of 240 cps.

Samples of this composition were combined with two different catalysts and their respective cure times on polyethylene coated Kraft paper (PEK) and supercalendered kraft paper (SCK) were recorded. Cure was effected by PPG model QC 1202AN UV Processor housing two medium-pressure mercury vapor source lamps each operating at 200 watts/in.² focused power. The results are tabulated below:

| Catalyst | UV Exposure Time for Good* Cure | |
|---|---|---|
|  | PEK | SCK |
| 2% (C$_{12}$H$_{25}$Ph)$_2$ISbF$_6$ | 0.15 sec. | 0.3 sec. |
| 4% (C$_{12}$H$_{25}$Ph)$_2$IHSO$_4$ | 1.5 sec. | 1.5 sec. |

*"Good Cure" results in a migration-free, no-smear, abhesive release coating.

Laminates were prepared from these coated papers using an aggressive SBR pressure-sensitive adhesive (Coated Products, Inc., No. 4950) in order to test the release pressure of the coatings. The force required to pull apart the lamina at 180° at a rate of 400 feet/sec was determined to be in the range of 40-60 grams, which is generally recognized as premium release performance in relation to aggressive adhesives.

EXAMPLE 4

10 parts by weight of allyl vinyl ether, 5 parts by weight of a 150 cps dimethylvinyl-chainstopped polydimethyl siloxane fluid and 0.05 parts by weight of a platinum catalyst (hexachloroplatinic acid complexed with methylvinyl tetramer) were dissolved in 100 parts by weight toluene. 100 parts by weight of a dimethylhydrogen-chainstopped linear polydimethyl-methylhydrogen siloxane copolymerfluid (150 cps) containing approximately 6.2 %

units was added slowly to the toluene solution, and this reaction mixture refluxed for 4½ hours. 5 parts by wight of n-hexane were added, and refluxing resumed for 11 hours more. Infrared examination indicated less than 0.1% unreacted Si—H groups remaining. The toluene was removed at 90° C. under aspirator vacuum. A clear amber fluid (2000 cps) was obtained and designated Sample A.

20 parts by weight of allyl vinyl ether were dissolved in a solvent mixture consisting of 50 parts by weight toluene and 50 parts by weight hexane. 0.05 parts by weight of a platinum catalyst as described above (Sample A) were added to the solution. 100 parts by weight of a 120 cps dimethylhydrogen-chainstopped polydimethyl-methylhydrogen siloxane copolymer fluid containing about 10.0%

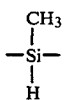

units was slowly added to the toluene hexane solution and then refluxed at 80° C. for 17 hours. No detectable unreacted Si—H was present in the reaction product. The solvent mixture was removed at 100° C. under vacuum. A clear amber fluid (2500 cps) was obtained and designated Sample B.

Two other samples (C and D) were prepared following the above procedures and differing only in amount of allyl vinyl ether (AVE) added and amount of product obtained.

Sufficient bis(dodecylphenyl)iodonium bisulfate catalyst was dissolved with the vinyloxy-functional fluid samples to give 2-5% by weight. The catalyzed compositions were then coated on 40-pound SCK and PEK papers using a doctor blade. The coated papers were then cured in a PPG model 1202 AN UV processor employing 2 Hanovia medium-pressure mercury vapor lamps at 200 watts/in.². The following results were recorded:

| Sample | % AVE | % Catalyst | UV Exposure Time (sec.) for Good Cure | |
|---|---|---|---|---|
|  |  |  | PEK | SCK |
| A | 8.7% | 4.0% | 0.3 | 1.5 |
| B | 16.7% | 3.0% | 0.15 | 0.3 |
| C | 15.4% | 2.0% | 0.3 | 1.5 |
| D | 11.8% | 4.0% | 0.15 | 0.3 |

EXAMPLE 5

Eugenol (4-allyl-2-methoxyphenol) was reacted with 2-chloroethyl vinyl ether to produce o-methoxy-para-allyl-2-vinyloxyethoxy benzene (MAVB). 77 parts by weight of MAVB were dispersed in approximately 350 parts by weight toluene with 0.05 parts by weight of a platinum catalyst. 200 parts by weight of a 95 cps silicone copolymer fluid containing approximately 9.9% Si—H groups were added to the toluene solution. The reaction mixture was then refluxed overnight to where Si—H functionality was below about 1%. The toluene was stripped off under vacuum to yield a 300 cps fluid product.

Ten parts of the reaction product were mixed with 0.15 parts bis(dodecylphenyl)iodonium hexafluoroantimonate to make a coating composition. This was applied to PEK sheets with a doctor blade, then cured as in the above examples on a PPG 1202 GC-AN processor. Smear- and migration-free cured abhesive coatings were obtained in about 0.12 sec. cure time.

EXAMPLE 6

Synthesis of o-Allyl-2-Vinyloxyethoxy Benzene 216.5 parts by weight toluene, 138.2 parts by weight 2-allyl phenol and 40 parts by weight NaOH in 60 parts by weight water were combined in a reaction vessel equipped with a Dean Stark trap, condenser and Nitrogen inlet. The components were mixed and the water removed as an azeotrope.

When all the water was removed, the toluene was dried using a Dean Stark apparatus with molecular sieves.

275 parts by weight Dimethyl Sulfoxide (DMSO) were added to the mixture and the heat lowered. 106.6 parts by weight of β-chloroethyl vinyl ether were then added slowly. After one hour, the heat was removed and the reaction mixture stirred for approximately 60 hours.

The mixture was poured into a large quantity (approximately 1000 parts by weight) of a 25% aqueous NaOH solution. Three layers separated.

The upper two layers were collected and washed twice with water, then placed in a rotary evaporator to removed the solvent.

Synthesis of o-Methoxy-para-Allyl-2-Vinyloxyethoxy Benzene 164.2 parts by weight eugenol, 275 parts by weight DMSO and 60 parts by weight finely ground NaOH were combined and mixed in a vessel equipped with a condenser and nitrogen inlet. The yellow reaction mixture exothermed to 45° C., and the temperature was slowly increased to 70° C. over about one hour, at which time 160 parts by weight β-chloroethyl vinyl ether were gradually added. The rate of addition of the ether was adjusted to keep the exotherm low.

The reaction mixture stirred at 70°-75° C. for about 5 hours after addition was complete. The heat was removed and the mixture stirred overnight.

The mixture was poured into approximately 2000 parts by weight boiling water, which caused an orange oil to separate to the top.

Toluene was added to separate the layers. The aqueous layer was extracted three times with small amounts of toluene, and then the toluene was combined with the orange oil.

The organic layer was washed three times with boiling water and once with cold water, and then placed in a rotary evaporator to remove the toluene.

After drying the sample overnight with KOH some crystalline product formed. This was recrystallized from hexane and stripped off the hexane to yield a solid and a liquid product.

Gas chromatography analysis showed both products to be o-methoxy-para-allyl-2-vinyloxyethoxy benzene. The yield was 92.3% (216.3 parts), the solid melting at 34°-37° C.

The above two compounds exhibiting both vinyloxy and allyl functionality were discovered to be suitable for use in the process of the present invention. See working examples 3 and 5, supra.

Obviously, modifications and variations of the present invention are possible in light of the foregoing disclosure. For example, particular techniques for synthesizing the starting materials and reactive intermediates like o-methoxy-para-allyl-2-vinyloxyethoxy benzene may be devised. It is understood, however, that any such incidental changes made in the particular embodiments of the invention as disclosed are within the full intended scope of the invention as defined by the appended claims.

We claim:

1. An organopolysiloxane having at least 1 Si-bonded vinyloxy functional group of the formula:

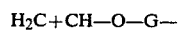

wherein G has the formula:

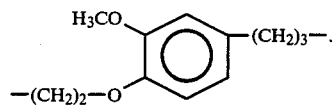

2. An organopolysiloxane having at least 1 Si-bonded vinyloxy functional group of the formula:

wherein G has the formula:

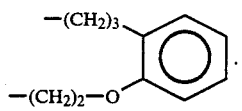

3. An organodisiloxane having two Si-bonded vinyloxy functional groups of the formula:

where G is alkylene or alkylene interrupted by at least one of a divalent hetero-radical or combination of hetero-radicals.

4. A photo-polymerizable composition comprising
(A) an organopolysiloxane having at least one Si-bonded vinyloxy functional group of the formula:

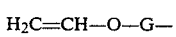

where G is alkylene or alkylene interrupted by at least one of a divalent hetero-radical or a combination of hetero-radicals; and (B) a catalytic amount of an onium salt having the formula:

$R_3S^+MX_n^-$, $R_3Se^+MX_n^-$, $R_4P^+MX_n^-$, or $R_4N^+MX_n^-$, where each R is, independently, a radical of from 1 to 30 carbon atoms, selected from the group consisting of aromatic carbocyclic radicals, heterocyclic radicals, substituted aromatic carbocyclic radicals and carbocyclic radicals; and $MX_n^-$ is a non-basic, non-nuclophilic anion.

5. A composition as defined by claim 4 wherein the onium salt component (B) is selected from the group consisting of bis(dodecylphenyl)iodonium hexafluoroantimonate, bis(dodecylphenyl)iodonium hexafluoroarsenate, and bis(dodecylphenyl)iodonium bisulfate.

6. The composition according to claim 5 wherein the onium salt component (B) is bis(dodecylphenyl)iodonium bisulfate.

7. A photo-polymerizable composition comprising
(A) an organopolysiloxane having at least 1 Si-bonded vinyloxy functional group of the formula:

$H_2C=CH-O-G-$ 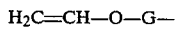

wherein G is propylene; and
(B) a catalytic amount of an onium salt selected from the group consisting of bis(dodecylphenyl)iodonium hexafluoroantimonate, bis(dodecylphenyl)iodonium hexafluoroarsenate, and bis(dodecylphenyl)iodonium bisulfate.

8. A photo-polymerizable composition comprising
(A) an organopolysiloxane having at least 1 Si-bonded vinyloxy functional group of the formula:

$H_2C=CH-O-G-$ 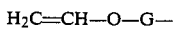

wherein G has the formula

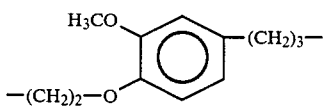

and
(B) a catalytic amount of an onium salt selected from the group consisting of bis(dodecylphenyl)iodonium hexafluoroantimonate, bis(dodecylphenyl)iodonium hexafluoroarsenate, and bis(dodecylphenyl)iodonium bisulfate.

9. A photo-polymerizable composition comprising
(A) an organopolysiloxane having at least 1 Si-bonded vinyloxy functional group of the formula:

$H_2C=CH-O-G-$ 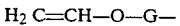

wherein G has the formula

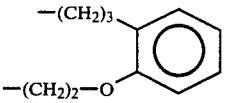

(B) a catalytic amount of an onium salt selected from the group consisting of bis(dodecylphenyl)iodonium hexafluoroantimonate, bis(dodecylphenyl)iodonium hexafluoroarsenate, and bis(dodecylphenyl)iodonium bisulfate.

10. A photo-polymerizable composition comprising
(A) an organopolysiloxane having at least 1 Si-bonded vinyloxy functional group of the formula:

$H_2C=CH-O-G-$ 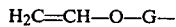

wherein G has the formula

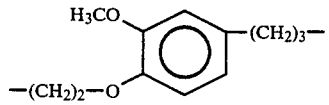

and
(B) a catalytic amount of bis(dodecylphenyl)iodonium bisulfate.

11. A photo-polymerizable composition comprising
(A) an organopolysiloxane having at least 1 Si-bonded vinyloxy functional group of the formula:

$H_2C=CH-O-G-$ 

wherein G has the formula

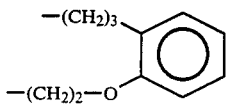

and
(B) a catalytic amount of bis(dodecylphenyl)iodonium bisulfate.

12. A process for preparing an organopolysiloxane having at least one vinyloxy functional group comprising the steps:
(1) reacting a compound having both allyl and vinyloxy functionality with an organopolysiloxane having at least 0.5 weight percent terminal or pendent Si-H groups in the presence of a catalytic amount of platinum containing catalyst; and
(2) recovering a vinyloxy functional organopolysiloxane having at least one vinyloxy functional group of the formula:

$H_2C=CH-O-G-$ 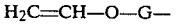

where G is alkylene or alkylene interrupted by at least one of a divalent hetero-radical or a combination of hetero-radicals, where said vinyloxy functional groups correspond to the hydrosilation reaction product of said Si-H groups and the allyl function of said compound having both allyl and vinyloxy functionality.

13. A process as defined in claim 12 wherein the compound having allyl and vinyloxy functionality is allyl vinyl ether.

14. A process as defined in claim 12 wherein the compound having allyl and vinyloxy functionality is synthesized from an allyl-functional compound and a vinyloxy-functional compound via condensation reaction.

15. A process as defined in claim 14 wherein said allyl-functional compound is an ortho-allyl phenol.

16. A process as defined in claim 14 wherein said allyl-functional compound is o-allylphenol and said vinyloxy-functional compound is 2-chloroethylvinyl ether.

17. A process as defined in claim 14 wherein said allyl-functional compound is 4-allyl-2-methoxyphenol and said vinyloxy-functional compound is 2-chloroethylvinyl ether.

18. A process as defined in claim 12 wherein said compound having allyl and vinyloxy functionality is o-allyl-2-vinyloxyethoxy benzene.

19. A process as defined in claim 12 wherein said compound having allyl and vinyloxy functionality is o-methoxy-para-allyl-2-vinyloxyethoxy benzene.

20. A process for preparing a photo-curable silicone release coating composition comprising the steps:
(1) reacting a compound having both allyl and vinyloxy functionality with an organopolysiloxane having at least 0.5 weight percent Si-H groups in the presence of a catalytic amount of a platinum containing catalyst;
(2) recovering a vinyloxy functional organopolysiloxane having at least one vinyloxy functional group of the formula $H_2C=CH-O-G-$ where G is alkylene or alkylene interrupted by at least one of a divalent hetero-radical or a combination of hetero-radicals, where said vinyloxy functional groups correspond to the hydrosilation reaction product of said Si-H groups and the allyl function of said compound having both allyl and vinyloxy functionality; and
(B) dissolving in said product a catalytic amount of an onium salt having the formula:

$R_2I^+MX_n^-$, $R_3S^+MX_n^-$, $R_3Se^+MX_n^-$, $R_4P^+MX_n^-$, $R_4N^+MX_n^-$, where each R is, independently, a radical of from 1 to 30 carbon atoms, selected from the group consisting of aromatic carbocyclic radicals, heterocyclic radicals, substituted aromatic carbocyclic radicals and carbocyclic radicals; and $MX_n^-$ is a nonbasic, non-nuclophilic anion.

21. A process as defined in claim 20 wherein the onium salt is selected from the group consisting of bis(dodecylphenyl)iodonium hexafluoroantimonate, bis(dodecylphenyl)iodonium hexafluoroarsenate, and bis(dodecylphenyl)iodonium bisulfate.

22. A process as defined in claim 21 wherein said onium salt is bis(dodecylphenyl)iodonium bisulfate.

23. A process for preparing a photo-curable silicone release coating composition comprising the steps:
(1) reacting o-methoxy-p-allyl-2-vinyloxyethoxy benzene with an organopolysiloxane having at least 0.5 weight percent Si—H groups in the presence of a catalytic amount of platinum containing catalyst;
(2) recovering a vinyloxy functional organopolysiloxane having at least one vinyloxy functional group of the formula:

$H_2C=CH-O-G-$ wherein G has the formula:

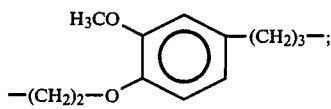

(3) dissolving in said product a catalytic amount of an onium salt having the formula:

$R_2I^+MX_n^-$, $R_3S^+MX_n^-$, $R_3Se^+MX_n^-$, $R_4P^+MX_n^-$, or $R_4N^+MX_n^-$, where each R is, independently, a radical of from 1 to 30 carbon atoms, selected from the group consisting of aromatic carbocyclic radicals, heterocyclic radicals, substituted aromatic carbocyclic radicals and carbocyclic radicals; and $MX_n^-$ is a nonbasic, non-nuclophilic anion.

24. The process of claim 22 wherein G has the formula

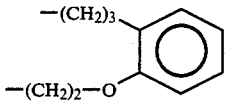

25. A process as defined in claim 20 wherein the compound having allyl and vinyloxy functionality is allyl vinyl ether.

26. A process as defined in claim 20 wherein the compound having allyl and vinyloxy functionality is synthesized from an allyl functional compound and a vinyloxy-functional compound via condensation reaction.

27. A process as defined in claim 26 wherein said allyl functional compound is an ortho-allyl phenol.

28. A process as defined in claim 26 wherein said allyl-functional compound is o-allylphenol and said vinyloxy-functional compound is 2-chloroethylvinyl ether.

29. A process as defined in claim 26 wherein said allyl-functional compound is 4-allyl-2-methoxyphenol and said vinyloxy-functional compound is 2-chloroethylvinyl ether.

30. A process as defined in claim 20 wherein said compound having allyl and vinyloxy functionality is o-allyl-2-vinyloxyethoxy benzene.

31. A process as defined in claim 20 wherein said compound having allyl and vinyloxy functionality is o-methoxy-para-allyl-2-vinyloxyethoxy benzene.

32. An article comprising a solid substrate at least one surface of which is coated with the composition of claim 4.

33. The article as defined in claim 32 wherein the solid substrate is selected from the group consisting of paper, polyethylene coated kraft paper and supercalendered kraft paper.

34. The article as defined in claim 32 wherein said composition has been cured on said solid substrate.

35. The article as defined in claim 34 wherein said cure is affected by brief exposure to UV radiation.

36. The composition as defined in claim 34 wherein said cured coating forms an abhesive surface thereon.

37. A process for preparing an organopolysiloxane having at least one vinyloxy functional group, comprising the steps:
(1) reacting a poly(dimethyl-methylhydrogen)siloxane copolymer and a compound selected from the group consisting of allyl vinyl ether, o-allyl-2-vinyloxyethoxy benzene, and o-methoxy-para-allyl-2-vinyloxyethoxy benzene in the presence of a catalytic amount of platinum containing catalyst; and
(2) recovering a vinyloxy functional organopolysiloxane having at least one vinyloxy functional group of the formula:

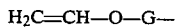

wherein G is propylene,

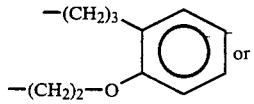

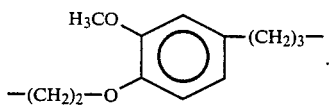

38. A process for preparing a photo-curable silicone release coating composition comprising the steps:
(1) reacting a poly(dimethyl-methylhydrogen)siloxane copolymer and a compound selected from the group consisting of allyl vinyl ether, o-allyl-2-vinyloxyethoxy benzene, and o-methoxy-para-allyl-2-vinyloxyethoxy benzene in the presence of a catalytic amount of platinum containing catalyst;
(2) recovering a vinyloxy functional organopolysiloxane having at least one vinyloxy functional group of the formula:

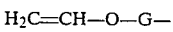

wherein G is propylene,

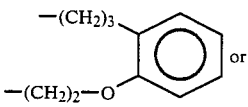

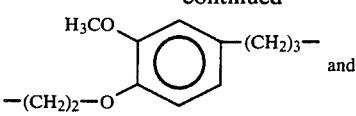

(3) dissolving in said product a catalytic amount of an onium salt having the formula $R_2I^+MX_n^-$, $R_3S^+MX_n^-$, $R_3Se^+MX_n^-$, $R_4P^+MX_n^-$, or $R_4N^+MX_n^-$, where each R is, independently, a radical of from 1 to 30 carbon atoms, selected from the group consisting of aromatic carbocyclic radicals, heterocyclic radicals, substituted aromatic carbocyclic radicals and carbocyclic radicals; and $MX_n^-$ is a non-basic, non-nuclophilic anion.

39. A photo-polymerizable composition comprising
(A) an organopolysiloxane having Si-bonded vinyloxy functional groups of the formula $H_2C=CH-O-G-$ wherein if (A) is (i) an organopolysiloxane, said organopolysiloxane is comprised of methylsiloxane units, and if (A) is (ii), an organodisiloxane, said organodisiloxane is derived fron tetramethyldisiloxane; and wherein G is alkylene or alkylene interrupted by at least one divalent hetero-radical or a combination of hetero-radicals; and
(B) a catalytic amount of an onium salt selected from the group consisting of 4,4'-di-p-butyldiphenyl iodonium hexafluoroarsenate, bis(dodecylphenyl)iodonium hexafluoroantimonate, and bis(dodecylphenyl)iodonium bisulfate.

40. A process for preparing a photo-curable silicone release coating composition comprising the steps:
(1) reacting a poly(dimethyl-methylhydrogen)siloxane copolymer and a compound selected from the group consisting of allyl vinyl ether, o-allyl-2-vinyloxyethoxy benzene, and o-methoxy-para-allyl-2-vinyloxyethoxy benzene in the presence of a catalytic amount of platinum containing catalyst;
(2) recovering a vinyloxy functional organopolysiloxane having at least one vinyloxy functional group of the formula:

$H_2C=CH-O-G-$ wherein G is propylene,

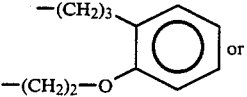

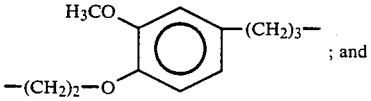

; and (3) dissolving in said product a catalytic amount of an onion salt selected from the group consisting of 4,4'-di-p-butyldiphenyl iodonium hexafluoroarsenate, bis(dodecylphenyl)iodonium hexafluoroantimonate, and bis(dodecylphenyl)iodonium bisulfate.

* * * * *